US011848123B2

(12) United States Patent
Huber et al.

(10) Patent No.: US 11,848,123 B2
(45) Date of Patent: *Dec. 19, 2023

(54) SOLID INSULATION MATERIAL

(71) Applicant: Siemens Aktiengesellschaft, Munich (DE)

(72) Inventors: Jürgen Huber, Erlangen (DE); Dieter Schirm, Breitengüssbach (DE); Matthias Übler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 232 days.

This patent is subject to a terminal disclaimer.

(21) Appl. No.: 15/743,811

(22) PCT Filed: May 19, 2016

(86) PCT No.: PCT/EP2016/061293
§ 371 (c)(1),
(2) Date: Jan. 11, 2018

(87) PCT Pub. No.: WO2017/012735
PCT Pub. Date: Jan. 26, 2017

(65) Prior Publication Data
US 2018/0204649 A1 Jul. 19, 2018

(30) Foreign Application Priority Data
Jul. 17, 2015 (DE) ..................... 10 2015 213 537.3

(51) Int. Cl.
| | |
|---|---|
| *H01B 3/40* | (2006.01) |
| *C08G 59/62* | (2006.01) |
| *C08G 59/68* | (2006.01) |
| *C09D 163/00* | (2006.01) |
| *H01B 3/04* | (2006.01) |
| *B32B 19/04* | (2006.01) |
| *B32B 27/38* | (2006.01) |
| *B32B 7/12* | (2006.01) |
| *C08G 59/24* | (2006.01) |
| *C08L 63/00* | (2006.01) |

(52) U.S. Cl.
CPC ................ *H01B 3/40* (2013.01); *B32B 7/12* (2013.01); *B32B 19/045* (2013.01); *B32B 27/38* (2013.01); *C08G 59/24* (2013.01); *C08G 59/62* (2013.01); *C08G 59/68* (2013.01); *C08L 63/00* (2013.01); *C09D 163/00* (2013.01); *H01B 3/04* (2013.01); *B32B 2264/1026* (2020.08); *B32B 2305/07* (2013.01); *B32B 2307/206* (2013.01); *B32B 2457/04* (2013.01)

(58) Field of Classification Search
CPC . H01B 3/40; H01B 1/026; H01B 3/04; C08K 2003/309; C25D 3/38; C25D 7/00; B32B 15/20; B32B 7/02; B32B 17/061; B32B 2255/10; B32B 2255/28; B32B 2307/732; B32B 2307/412; B32B 2307/202; B32B 2457/208; B32B 27/36; B32B 27/325; B32B 27/281; B32B 27/365; B32B 27/205; B32B 7/12; B32B 27/08; B32B 27/06; B32B 27/34; B32B 19/045; B32B 27/38; B32B 2264/1026; B32B 2305/07; B32B 2307/206; B32B 2457/04; C23C 14/14; H03K 17/962; C08G 59/24; C08G 59/62; C08G 59/68; C08L 63/00; C09D 163/00; H02K 3/30
See application file for complete search history.

(56) References Cited

U.S. PATENT DOCUMENTS

| | | | | |
|---|---|---|---|---|
| 2,917,570 A | * | 12/1959 | Wolff | ........................ H01B 3/04 |
| | | | | 174/120 R |
| 4,020,017 A | | 4/1977 | Smith et al. | .................... 528/361 |
| 4,112,183 A | | 9/1978 | Smith | ........................... 428/363 |
| 4,173,593 A | | 11/1979 | Smith et al. | .................... 525/109 |
| 4,296,018 A | * | 10/1981 | Smith | ....................... H02K 3/30 |
| | | | | 523/456 |

(Continued)

FOREIGN PATENT DOCUMENTS

| | | | | |
|---|---|---|---|---|
| CH | 648146 A5 | 2/1985 | ............... | H01B 3/04 |
| CN | 1062545 A | 7/1992 | ............ | C08F 267/10 |

(Continued)

OTHER PUBLICATIONS

Machine translation of DD 157484. (Year: 1982).*
Russian Office Action, Application No. 2018105689/04, 9 pages, dated Sep. 7, 2018.
Döring, Manfed et al., "Polymerization of Epoxy Resins Initiated by Metal Complexes," Polymer International, Bd. 58, No. 9, pp. 976-988, Jun. 25, 2009.
German Office Action, Application No. 102015213537.3, 8 pages, dated Mar. 15, 2016.

(Continued)

*Primary Examiner* — John D Freeman
(74) *Attorney, Agent, or Firm* — Slayden Grubert Beard PLLC

(57) ABSTRACT

The present disclosure relates to insulation. Various embodiments thereof may include a solid insulation material and/or a formulation for production of an insulation system. For example, a formulation for an impregnating agent may include: an impregnating resin comprising a cycloaliphatic epoxy resin having a viscosity of less than 1500 mPas at impregnation temperature; and a curing catalyst deposited in the solid insulation material. The curing catalyst may be reactive toward the cycloaliphatic epoxy groups of the cycloaliphatic epoxy resin in the formulation of the impregnating agent but be sufficiently reactively inert with respect to the functional groups of the tape adhesive likewise present in the solid insulation material to confer storage stability to the solid insulation material.

18 Claims, 4 Drawing Sheets

(56) References Cited

U.S. PATENT DOCUMENTS

| | | | | |
|---|---|---|---|---|
| 4,336,302 A | * | 6/1982 | Ihlein | C08G 59/68 428/324 |
| 4,656,090 A | | 4/1987 | Markovitz | 428/364 |
| 5,314,984 A | | 5/1994 | Markovitz et al. | 528/117 |
| 5,393,805 A | * | 2/1995 | Koyama | C08G 59/18 428/413 |
| 6,395,330 B1 | | 5/2002 | Gsellmann et al. | 427/116 |
| 2001/0007881 A1 | * | 7/2001 | Bitler | C08L 101/00 523/136 |
| 2002/0010289 A1 | | 1/2002 | Smith et al. | 525/524 |
| 2008/0020231 A1 | * | 1/2008 | Yamada | H01L 23/49894 428/626 |
| 2013/0131218 A1 | | 5/2013 | Gröppel et al. | 523/456 |
| 2014/0010983 A1 | * | 1/2014 | Gorodisher | C08G 59/504 428/41.8 |
| 2016/0032065 A1 | * | 2/2016 | Fukuda | C08G 59/621 428/327 |

FOREIGN PATENT DOCUMENTS

| | | | | |
|---|---|---|---|---|
| CN | 103113526 A | | 5/2013 | C08F 283/00 |
| CN | 103554436 A | | 2/2014 | C08G 59/20 |
| DE | 157484 A | * | 11/1982 | |
| DE | 102009013870 A1 | | 9/2010 | C08J 5/04 |
| DE | 102009053253 A1 | | 5/2011 | C08K 3/20 |
| DE | 102010032555 A1 | | 2/2012 | C08K 3/22 |
| EP | 0996132 A1 | | 4/2000 | B05D 5/12 |
| SU | 473362 A3 | | 6/1975 | C08L 63/00 |
| WO | 2017/012735 A1 | | 1/2017 | C08G 59/62 |

OTHER PUBLICATIONS

International Search Report and Written Opinion, Application No. PCT/EP2016/061293, 29 pages, dated Aug. 31, 2016.
Russian Office Action, Application No. 2018105689/04, 9 pages, dated Aug. 28, 2019.
Extended European Search Report, Application No. 19000320.2, 10 pages, dated Oct. 24, 2019.
Chinese Office Action, Application No. 201680052803.9, 10 pages, dated Jun. 3, 2020.
Chinese Office Action, Application No. 201680052803.9, 13 pages, dated Jan. 8, 2019.

* cited by examiner

FIG 2

Tab. 1:

| First curing catalyst | Concentration in the tape adhesive, % by wt. | Gelation time, 70°C | Concentration in the impregnation resin, % by wt. | Gelation time, 70°C |
|---|---|---|---|---|
| Curing catalyst 1 | 5 | 10-17 days | 10 | 72-144 hours |
| Curing catalyst 2 | 5 | 10-17 days | 10 | not gelated |
| Curing catalyst 3 | 1 | 10-17 days | 10 | << 1 day |
| Curing catalyst 4 | 10 | 10-17 days | 10 | << 1 day |
| Curing catalyst 5 | 5 | > 17 days | 10 | <<< 1 day |
| Curing catalyst 6 | 5 | 10-17 days | 10 | <<< 1 day |
| Curing catalyst 7 | 1 | > 17 days | 10 | < 1 day |
| Curing catalyst 8 | 5 | 30 hours | 10 | <= 67 hours |
| Curing catalyst 9 | 5 | 7.5-28.5 hours | 10 | <= 67 hours |
| Curing catalyst 10 | 1 | 7.5-28.5 hours | 10 | not gelated |
| Curing catalyst 11 | 1 | 7.5-28.5 hours | 10 | not gelated |
| Curing catalyst 12 | 0.5 | 7.5-28.5 hours | 10 | not gelated |
| Curing catalyst 13 | 5 | 48.5-64.5 hours | 10 | ~ 330 hours |
| Curing catalyst 14 | 5 | 40-48.5 hours | 10 | 240-252 hours |
| Curing catalyst 15 | 5 | 7.5-28.5 hours | 10 | ~ 340 hours |
| Curing catalyst 16 | 5 | 4.5 hours | 10 | 135-151 hours |
| Curing catalyst 17 | 5 | 7.5-28.5 hours | 10 | ~ 400 hours |
| Curing catalyst 18 | 5 | 7.5-28.5 hours | 10 | 240-252 hours |

FIG 3

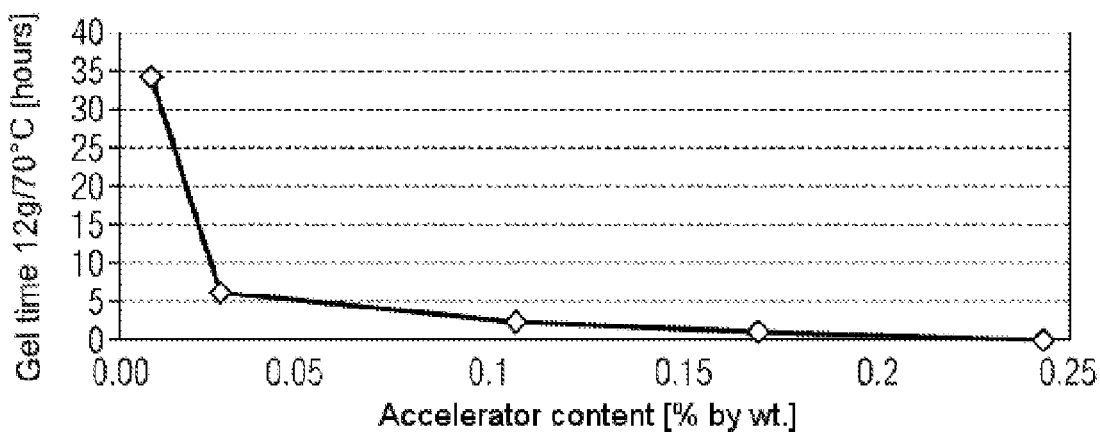

FIG 4

Tab. 2: Potential catalysts for impregnating resin curing

| Second curing catalyst "bath accelerator" | Concentration in impregnation resin, % by wt. | Complete solubility in the impregnating agent | Molding after 10 h/145°C | Molding after +10 h/180°C |
|---|---|---|---|---|
| Curing catalyst 19 | 1 | no | no | yes |
| Curing catalyst 20 | 1 | yes | no | no |
| Curing catalyst 21 | 10 | yes | no | no |
| Curing catalyst 22 | 1 | no | no | yes |
| Curing catalyst 23 | 1 | yes | no | yes |
| Curing catalyst 24 | 1 | yes | no | yes |
| Curing catalyst 25 | 1 | no | no | no |
| Curing catalyst 26 | 1 | yes | no | yes |
| Curing catalyst 27 | 1 | no | no | no |
| Curing catalyst 28 | 1 | yes | no | yes |
| Curing catalyst 29 | 1 | yes | no | yes |

SOLID INSULATION MATERIAL

CROSS-REFERENCE TO RELATED APPLICATIONS

This application is a U.S. National Stage Application of International Application No. PCT/EP2016/061293 filed May 19, 2016, which designates the United States of America, and claims priority to DE Application No. 10 2015 213 537.3 filed Jul. 17, 2015, the contents of which are hereby incorporated by reference in their entirety.

TECHNICAL FIELD

The present disclosure relates to insulation. Various embodiments thereof may include a solid insulation material, e.g., in tape form, and/or a formulation for production of an insulation system in a vacuum impregnation method therewith, and to machines having an insulation system of this kind, especially for the medium- and high-voltage sector, namely for medium- and high-voltage machines, especially rotating electrical machines in the medium- and high-voltage sector and semi-finished products for electrical switchgear.

BACKGROUND

Electrical machines (e.g., motors, generators) have, in the multitude of the longitudinal grooves in their lamination stacks, special kinds of coil windings or conductor bars, generally made from copper or another material of high conductivity. In the case of an electric motor, by supplying current in a time-selective manner, a magnetic field propagating in all directions is generated, and this drives the freely rotating rotor suspended in the stator cavity. The rotor reacts to the induced magnetic field in the form of forced rotation, for example owing to a multitude of applied permanent magnets, and hence converts electrical energy to kinetic energy. In electrical terms, the laminate stack is at ground potential, but the coils are at high kilovoltage potential. The coils fitted into the stator grooves must accordingly be electrically insulated with respect to ground potential.

For this purpose, each and every coil is insulated with a special mica-based tape (called mica tape), repeatedly and with defined overlap. Mica is used since, being a particulate inorganic barrier material, especially in platelet form, it is capable of retarding electrical erosion under electrical partial discharges effectively and for a long period, for example over the entire lifetime of the machine, or of the generator, and has good chemical and thermal stability. Mica tapes consist of mica paper and one or more carriers, for example fabrics, film(s), bonded to one another via a tape adhesive. Mica tapes are necessary since mica paper alone does not have the mechanical strength needed for an insulation process.

According to the application, further additives may be added to the tape adhesive, for example accelerator substances, which have an initiating effect on the thermal curing of an externally applied impregnating agent: after the mica tape-insulated coils have been fitted into the stator laminate stacks and electrically connected, for avoidance of partial discharges during later operation, the air in the cavities of the windings and especially in the groove gaps of the stator laminate stack is eliminated. Since this distance from current-carrying isolated coil to the laminate stack is generally kept as small as possible, field strengths of several kV/mm there are not unusual. There is corresponding stress on the insulation material.

Suitable insulation materials for vacuum impregnation processes may include thermally curable epoxy resin/anhydride mixtures, because they are used for flooding of the stators of the electrical machines, composed of their individual parts, with the fitted and mica tape-insulated coils. During a specific vacuum impregnation process, the VPI (vacuum pressure impregnation) method, these stators have to date been wholly flooded with a mobile epoxy resin/phthalic anhydride formulation in a vacuum chamber and then impregnated under pressure.

Depending on the interplay between the accelerator in the mica tape and impregnating agent, there may already be gelation of the impregnating agent composed of epoxy resin/phthalic anhydride that has penetrated into the mica tape insulation during the impregnation phase. The final curing is generally affected under standard pressure in an industrial furnace. The task fulfilled here by the curing catalyst in the mica tape, also referred to in the art as accelerator, or tape accelerator, is to gelate and to cure the applied impregnating agent composed of epoxy resin and phthalic anhydride within a desired period of time at a defined temperature. The industrial standard impregnating agent that has become established in electrical machines is a mixture of distilled bisphenol A diglycidyl ether and methylhexahydrophthalic anhydride, a very mobile formulation which, in the absence of accelerator substances, is storage-stable at impregnation temperature for a desirably long period (for example doubling of the dynamic initial viscosity only after several weeks), but reacts rapidly to give the high polymer in the presence of an accelerator. However, since the mica tape provided with tape adhesive and tape accelerator should likewise have storage stability for a sufficiently long period, tape adhesive and curing catalyst are preferably very substantially inert toward one another in the solid insulation material.

SUMMARY

More particularly, all three components, i.e. tape adhesive, curing catalyst, and applied impregnating agent, only react with one another at the moment when they encounter one another during the VPI process. This achieves the best possible crosslinking and attachment, compatibility and freedom from cavities in the insulation, which in turn leads to an optimized lifetime of the "main insulation" of the electrical machine that subsequently arises in the curing. Correspondingly, the teachings of the present disclosure may enable a solid insulation material, i.e., for example, a mica tape on the one hand and a formulation for an impregnating agent on the other hand, each of which is intrinsically storage-stable and is additionally fundamentally acid anhydride-free and usable in a vacuum impregnation process for production of an insulation system for an electrical machine, for example for a generator.

As an example, some embodiments may include a formulation for an impregnating agent for production of an insulation system by means of vacuum impregnation, especially VPI impregnation, which is capable of impregnating a solid insulation material with a carrier, a barrier material and an accompanying tape adhesive, which for this purpose comprises a correspondingly low-viscosity impregnating resin having a viscosity of less than 1500 mPas, preferably less than 500 mPas, more preferably less than 150 mPas, at impregnation temperature, characterized in that the impregnating resin is a cycloaliphatic epoxy resin which reacts with a first curing catalyst deposited in the solid insulation material and/or a second curing catalyst distributed in the formulation of the impregnating agent, wherein the first curing catalyst that originates from the solid insulation material is very reactive toward the cycloaliphatic epoxy groups of the cycloaliphatic epoxy resin in the formulation of the impregnating agent but is sufficiently reactively inert with respect to the functional groups of the tape adhesive likewise present in the solid insulation material to confer storage stability to the solid insulation material, wherein the second curing catalyst only lights off at higher temperatures, for example at above 100° C., such that the formulation of the impregnating agent has sufficient storage stability.

In some embodiments, the epoxy resin is selected from the group of the following compounds: 7-oxabicyclo[4.1.0]hept-3-ylmethyl 7-oxabicyclo[4.1.0]heptane-3-carboxylate; 2-(3,4-epoxy)-cyclohexyl-5,5-spiro(3,4-epoxy)cyclohexane-m-dioxane; bis(3,4-epoxycyclohexylmethyl) adipate; bis(3,4-epoxycyclohexyl) adipate; 4-(1,2-epoxyethyl)-1,2-epoxycyclohexane and/or 3,4-epoxycyclohexylmethyl 3',4'-epoxycyclohexanecarboxylate, and any desired mixtures and blends of the above-listed compounds.

In some embodiments, the second curing catalyst is present in the formulation in an amount of 0% by weight-10% by weight, especially of 0.01% to 7.5% by weight and especially preferably in a content of 0.1% to 5% by weight, based on the cycloaliphatic epoxy resin.

In some embodiments, the second curing catalyst initiates ionic curing.

In some embodiments, the second curing catalyst has a lightoff temperature of >100° C., preferably >120° C., more preferably >140° C.

In some embodiments, additives and/or fillers are provided. In some embodiments, nanoparticles are provided. In some embodiments, the nanoparticles are dispersed in the formulation. In some embodiments, the nanoparticles are in the form of polymeric nanoparticles. In some embodiments, the nanoparticles are present with a particle diameter of less than 300 nm, especially in a range from 5 to 150 nm. In some embodiments, the nanoparticles are present in a content of 0.1% to 35% by weight, preferably 0.5% to 10% by weight, more preferably 1% to 5% by weight.

Some embodiments may include a solid insulation material usable together with the formulation of the impregnating agent for production of an insulation system in a vacuum impregnation process, wherein said solid insulation material comprises a carrier, a barrier material, a first curing catalyst and a tape adhesive, wherein the tape adhesive is inert toward the first curing catalyst which reacts under the conditions of the vacuum impregnation with the cycloaliphatic epoxy groups of a cycloaliphatic epoxy resin as present in the formulation of the impregnating agent as described above, with gelation times of 1 to 15 h, preferably 2 to 12 h, more preferably 2.5 to 10 h, at impregnation temperature.

In some embodiments, there is a carrier in the form of woven fabric, nonwoven fabric, paper and/or in the form of a film. In some embodiments, the barrier material is present on, in and/or atop the carrier. In some embodiments, the barrier material is at least partly particulate. In some embodiments, the barrier material is at least partly in platelet form.

In some embodiments, the tape adhesive is in the form of a glycidyl ether epoxy resin having repeat units from n=0 to n=50, preferably from n=1 to n=30, more preferably from n=2 to n=18. In some embodiments, the tape adhesive is in the form of an epoxy novolak and/or epoxy-phenol novolak having functionalities n=0.1 to 8. In some embodiments, the tape adhesive is in the form of diols, triols and/or polyols. In some embodiments, the tape adhesive is present in an amount of 1% to 30% by weight, preferably 2% to 15% by weight, more preferably 5% to 10% by weight.

In some embodiments, the first curing catalyst is present in the solid insulation material in a concentration of 0.001% by weight to 7.5% by weight, for example in the range from 0.001% to 5% by weight, especially from 0.001% by weight to 2% by weight, and preferably from 0.001% by weight to 1% by weight. In some embodiments, the first curing catalyst is in the form of a superacid and/or a superacid derivative. In some embodiments, the superacid has a pKa of less than −3. In some embodiments, the first curing catalyst is in the form of a thermally activatable superacid. In some embodiments, the first curing catalyst is in the form of a latently active superacid. In some embodiments, the first curing catalyst lights off at a temperature in the range from 20° C. to 100° C., preferably from 50° C. to 80° C. and especially preferably from 55° C. to 75° C. In some embodiments, the first curing catalyst is in the form of a complex of a superacid fluoro anion with a crown ether. In some embodiments, the first curing catalyst is in the form of a complex of a silver hexafluoroantimonate with a 15-crown-5 crown ether. In some embodiments, the first curing catalyst in the cured impregnating agent in the insulation system reaches a glass transition temperature greater than 110° C.

Some embodiments include the use of an insulation system produced by vacuum impregnation with a solid insulation material as described above and a formulation of an impregnating agent as described above in medium- and high-voltage machines, especially rotating electrical machines in the medium- and high-voltage sector and in electrical switchgear, medium- and high-voltage applications, bushings, transformer bushings, generator bushings and/or HVDC bushings, and in corresponding semifinished products.

Some embodiments may include electrical machines, preferably rotating electrical machines, more preferably rotating electrical machines in the medium- and high-voltage sector and electrical switchgear, medium- and high-voltage applications, bushings, transformer bushings, generator bushings and/or HVDC bushings, and corresponding semifinished products, comprising an insulation system produced with a formulation as described above and/or a solid insulation material as described above.

BRIEF DESCRIPTION OF THE DRAWINGS

FIG. 2 is a table in which the reactivity of the tape adhesive toward various first curing catalysts is collated.

FIG. 3 is a graph showing the gelation times (12 g, 70° C.) of these curing catalysts in a cycloaliphatic oxirane.

FIG. 4 shows, in table 2, a list of the compounds that may be used by way of example as second curing catalysts, i.e. as what are called bath curing catalysts, because they are present in the liquid insulating composition.

DETAILED DESCRIPTION

Figure 1:
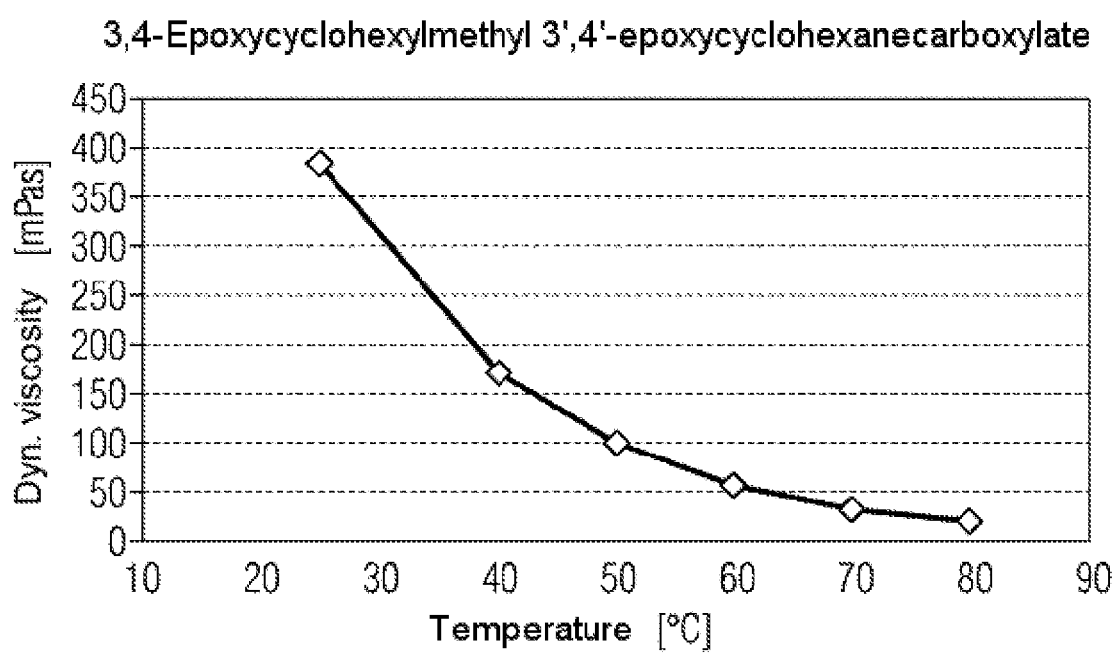
FIG. 1 is a graph showing the temperature-dependent dynamic viscosity of the cycloaliphatic epoxy resin 3,4-epoxycyclohexylmethyl 3',4'-epoxycyclohexanecarboxylate.

Typically, the impregnating agent used to date for similar insulation systems has been an epoxy resin/phthalic anhydride mixture. Curing catalysts present in the solid insulation material that have been used to date, in the case of acid anhydride-containing impregnating resins, have been, for example, transition metal salts of organic acids and/or substituted amines, for example zinc naphthenate salts. In this case, the glass transition temperatures of the substituted amine derivatives are generally higher than those of transition metal salts.

The principle by which generators work is the inverse of that of engines. Mechanical energy (fuel combustion in turbine-driven power plants, hydropower, etc.) drives the rotor present in the cavity, which in turn induces electrical currents in the stator coils, and these in turn, after synchronization, are fed into the grid. Thus, the laminate stack here too is electrically at ground potential, but the coils are at high kilovolt potential. Since generators, however, are very large electrical machines with high nameplate voltages (generally higher than in motors), the mica tape windings in the stator coils are often wound several times more frequently than in the typically smaller electric motors, to keep the field strengths within an acceptable range. The impregnation of all these mica tape layers places high demands on the dynamic viscosity of the impregnating agent in the VPI process. Impregnated but as yet uncrosslinked generator stators are frequently also gelated and cured while rolling, in order that the full impregnation of all mica tape layers, for example totaling up to one centimeter, on each stator bar is assured. For that reason alone, gelation times required in the generator construction are much longer than in the VPI process for electric motors. Correspondingly, it is advantageous when the curing catalyst is chosen such that a sufficiently long gelation phase in the generator production is assured. At the same time, the curing catalyst should nevertheless be sufficiently easily manageable in terms of reaction enthalpy and hence release less heat in the reaction to give the polymer than, for example, a tape accelerator suitable for motor production.

Owing to the toxicological concerns against unrestricted use of phthalic anhydrides, impregnating agents used in the future will be phthalic anhydride-free or completely anhydride-free epoxy-based impregnating agents, which are polymerized using curing catalysts.

In spite of the preference for the use of distilled bisphenol F diglycidyl ether as a basis for the anhydride-free impregnating agent, as known from the prior applications DE 102014219844.5; DE 102014221715.6; DE 102015205328.8, DE 102015202053.3; DE 102015204885.3, the disclosure content of which is hereby incorporated in the present application, for some applications the required impregnatability of—for example—generator stator bars the dynamic viscosity of this anhydride-free impregnating agent is inadequate. There is also a constant decrease in the glass transition temperatures of ionically cured epoxy resins of the bisphenol A diglycidyl ether type toward bisphenol F diglycidyl ether.

Accordingly, the teachings of the present disclosure provide a formulation for an impregnating agent for production of an insulation system by means of vacuum impregnation, especially VPI impregnation, which is capable of impregnating a solid insulation material with a carrier, a barrier material and an accompanying tape adhesive, which for this purpose comprises a correspondingly low-viscosity impregnating resin having a viscosity of less than 1500 mPas, less than 500 mPas, or less than 150 mPas, at impregnation temperature, characterized in that the impregnating resin is a cycloaliphatic epoxy resin which reacts with a first curing catalyst deposited in the solid insulation material and/or a second curing catalyst distributed in the formulation of the impregnating agent, wherein the first curing catalyst ("tape accelerator") that originates from the solid insulation material is very reactive toward the cycloaliphatic epoxy groups of the cycloaliphatic epoxy resin in the formulation of the impregnating agent but is sufficiently reactively inert with respect to the functional groups of the tape adhesive likewise present in the solid insulation material to confer storage stability to the solid insulation material, wherein the second curing catalyst ("bath accelerator") only lights off at higher temperatures, for example at above 100° C., such that the formulation of the impregnating agent has sufficient storage stability.

In some embodiments, a cycloaliphatic epoxy resin may have at least one oxirane functionality in at least one cycloaliphatic system. In some embodiments, the epoxy resin, for formation of a network-like structure in the curing, may comprise at least two cycloaliphatic rings, wherein each bears at least one oxirane functionality.

In some embodiments, a solid insulation material may be used with the formulation of the impregnating agent for production of an insulation system in a vacuum impregnation process, wherein said solid insulation material comprises a carrier, a barrier material, a first curing catalyst and a tape adhesive, wherein the tape adhesive is inert toward the first curing catalyst which reacts under the conditions of the vacuum impregnation with the cycloaliphatic epoxy groups of a cycloaliphatic epoxy resin as present in the formulation of the impregnating agent, with gelation times of 1 to 15 h, 2 to 12 h, or 2.5 to 10 h, at impregnation temperature.

In some embodiments, the insulation system thus produced is incorporated in electrical machines, rotating electrical machines, e.g., rotating electrical machines in the medium- and high-voltage sector and in electrical switchgear, medium- and high-voltage applications, bushings, transformer bushings, generator bushings and/or HVDC bushings, and in corresponding semifinished products.

In some embodiments, electrical machines, e.g., rotating electrical machines, rotating electrical machines in the medium- and high-voltage sector and electrical switchgear, medium- and high-voltage applications, bushings, transformer bushings, generator bushings and/or HVDC bushings, and corresponding semifinished products, comprise an insulation system of this kind.

In some embodiments, a carrier in the form of woven fabric, for example glass fiber weave, nonwoven fabric, for example fleece, especially a polyester fleece, paper and/or film is present in the solid insulation material. This carrier in the form of a film may also be perforated. The particulate barrier material is present on, in and/or atop this carrier in the solid insulation material.

In some embodiments, the barrier material may be at least partly in platelet form. More particularly, for example, mica may be used as barrier material.

In some embodiments, a tape adhesive in the form of a glycidyl ether epoxy resin having repeat units from n=0 to n=50, from n=1 to n=30, or from n=2 to n=18, is present in the solid insulation material. In some embodiments, the tape adhesive is in the form of an epoxy novolak and/or epoxy-phenol novolaks having functionalities n=0.1 to 8.

In some embodiments, the tape adhesive joins the at least one carrier and the barrier material in the solid insulation material of the insulation system. It is present in the solid insulation material in an amount in the range from 1% to 30% by weight, 2% to 15% by weight, or 5% to 10% by weight.

In some embodiments, the first curing catalyst (called "tape curing catalyst" or else "tape accelerator") is present in the solid insulation material in a concentration of 0.001% by weight to 7.5% by weight, for example in the range from 0.001% to 5% by weight, especially from 0.001% by weight to 2% by weight, and preferably from 0.001% by weight to 1% by weight, such that gelation times of several hours are achievable.

In some embodiments, a second curing catalyst ("bath curing catalyst") having a lightoff temperature of, for example, >100° C., >120° C., or >140° C., is present in the formulation. This second curing catalyst may be present in the formulation for the impregnating agent in a content of 0% by weight-10% by weight, especially of 0.01% to 7.5% by weight, and especially in a content of 0.1% to 5% by weight, based on the cycloaliphatic epoxy resin. In some embodiments, the first and second curing catalysts are ionically active curing catalysts. The two curing catalysts may be present simultaneously, but each of the curing catalysts may also be present alone. For instance, an insulation system may be produced solely using the first curing catalyst and solely using the second curing catalyst.

In some embodiments, the selection of the respective oxirane-containing components, the tape adhesive in the solid insulation material on the one hand and the impregnating resin in the formulation on the other hand, be made such that different oxirane species are chosen. For example, a 1,2-terminal oxirane as tape adhesive may be combined with a cycloaliphatic oxirane as impregnating resin in the vacuum impregnation process. For example, the tape adhesive used may be a material based on 1,2-oxirane epoxy resin groups, such as a chain-extended epoxy resin with n≥1 and/or higher-functionality epoxy-phenol novolaks. A suitable first curing catalyst provided in the solid insulation material is, for example, a superacid, especially a thermally activatable superacid, which initiates a cationic, thermally driven gelation and of the cycloaliphatic oxirane epoxy resin during the vacuum impregnation process.

In some embodiments, the first curing catalyst initiates the polymerization of the impregnating resin, the cycloaliphatic epoxy resin, at temperatures in the range from 20° C. to 100° C., from 50° C. to 80° C., or from 55° C. to 75° C. The lowest lightoff temperature of the second curing catalyst may also directly follow on from the highest lightoff temperature of the first curing catalyst.

In some embodiments, a filler and/or additives are present in the formulation of the impregnating agent. In some embodiments, there is a filler in the form of nanoparticles. In some embodiments, the nanoparticles are in dispersed form. In some embodiments, the nanoparticles are in the form of polymeric nanoparticles. In some embodiments, the nanoparticles are present in the formulation with a particle diameter of 5 nm to 300 nm, especially with a particle diameter of less than 150 nm. In some embodiments, the nanoparticles are present in the formulation in a content of 0.1% to 35% by weight.

Especially for low-defect impregnation of large generator stators, extremely mobile impregnating agents may provide improved distribution. Since distilled bisphenol A diglycidyl ether usually has a dynamic viscosity of about 4500 mPa·s at room temperature, lowering to the necessary 25-50 mPa·s is not achievable for manufacturing purposes by raising the temperature. Switching to distilled bisphenol F diglycidyl ether having a dynamic room temperature viscosity of about 1500 mPa·s and ionic polymerization is accordingly appropriate to the purpose, as already explained in the following German national patent applications, the disclosure content of which is hereby incorporated into the present description: DE 102014219844.5; DE 102014221715.6; DE 102015205328.8; DE 102015202053.3; DE 102015204885.3.

In some embodiments, ionic polymerization of anhydride-free, distilled 1,2-oxirane epoxy resins, for example of the bisphenol A diglycidyl ether and/or bisphenol F diglycidyl ether types, is appropriate to the purpose. For large electrical machines having a particularly large number of mica tape layers that are thus difficult to impregnate, however, an impregnating agent of particularly low viscosity, e.g. a mobile impregnating agent, is needed, and one which additionally gelates very slowly, to assure complete impregnation. The first curing catalyst in the mica tape may be in a particularly low concentration in order to induce gelation times of several hours. At the same time, embodiments may include first curing catalysts where the glass transition temperature of the cured impregnating agent in the insulation system is greater than 110° C., greater than 130° C., or greater than 150° C. Especially latently active superacids, for example acids having a pKa less than −3, enable impregnating agents having high glass transition temperatures, entirely without an anhydride hardener component.

In some embodiments, the "first curing catalyst" is the curing catalyst present in the solid insulation material, and comprises a thermally activatable superacid and/or a thermally activatable superacid derivative (blocked superacid), for example a complex of a tetrafluoroborate, sulfonium derivative, hexafluoroantimonate and/or a hexafluorophosphate as representatives of the so-called superacids or superacid salts. In this case, for example, compounds having quaternary organic ammonium and/or else antimony-free compounds (curing catalysts 5 to 7) have given good results, as apparent in FIG. 2, table 1. These thermally activatable superacid derivatives may be complexed, for example, with a crown ether, for example 15-crown-5 crown ether, and the like. An illustrative complex is $AgSbF_6$.

For example, a first curing catalyst of this kind initiates a cationic, thermally driven gelation and polymerization of the impregnating resin within the range from 20° C. to 100° C. In some embodiments, the impregnating resin is a cycloaliphatic epoxy resin selected from the group of the following compounds: 7-oxabicyclo[4.1.0]hept-3-ylmethyl 7-oxabicyclo[4.1.0]heptane-3-carboxylate; 2-(3,4-epoxy)cyclohexyl-5,5-spiro(3,4-epoxy)-cyclohexane-m-dioxane; bis(3,4-epoxycyclohexylmethyl) adipate; bis(3,4-epoxycyclohexyl) adipate; 4-(1,2-epoxyethyl)-1,2-epoxycyclohexane and/or 3,4-epoxycyclohexylmethyl 3',4'-epoxycyclohexanecarboxylate, and any desired mixtures and blends of the above-listed compounds.

Typical contents for gelation of cycloaliphatic epoxy resins with the first curing catalysts mentioned that are present in the solid insulation material may comprise very much less than 1% by weight, based on the cycloaliphatic epoxy resin of the formulation for the impregnating agent, which comes into contact with this first curing catalyst during the vacuum process. In some embodiments, the cycloaliphatic epoxy resin comprises 3,4-epoxycyclohexylmethyl 3',4'-epoxycyclohexanecarboxylate, a very mobile epoxy resin, which can be used even without a reactive diluent and has been found to be very storage-stable.

FIG. 1 shows a graph that shows the temperature-dependent dynamic viscosity of the cycloaliphatic epoxy resin 3,4-epoxycyclohexylmethyl 3',4'-epoxycyclohexanecarboxylate. For attainment of a required storage stability in the solid insulation material, for example at room temperature and especially at vacuum hold temperature and impregnation temperature over a duration of several hours, the first curing catalyst is comparatively inert toward the tape adhesive material. This especially also under the conditions of the vacuum hold temperature and/or impregnation temperature, which is, for example, within the range between 25° C. and 100° C., especially between 50° C. to 80° C., most preferably between 55° C. to 75° C. Suitable examples are tape adhesive materials wherein the main component has only 1,2-oxirane epoxy groups.

FIG. 2 shows table 1, in which the reactivity of the tape adhesive toward various first curing catalysts is collated. Compounds that have a relatively short gelation time in the cycloaliphatic resin (impregnating resin) but a relatively high storage stability in 1,2-oxirane group epoxy resin (tape adhesive) have been identified. For example, the thermally activatable superacids used as curing catalyst 5 to 7 are capable of gelating cycloaliphatic epoxy resin exceptionally rapidly at 70° C., but are extremely inert toward conventional epoxy resins containing 1,2-oxirane groups, which find use as tape adhesive materials in the mica tape. For instance, a blocked superacid used by way of example with a concentration of 0.02% in the 3,4-epoxycyclohexylmethyl 3',4'-epoxycyclohexanecarboxylate gives a gelation time of ~10 h at 70° C., whereas a concentration of 2.5% in a distilled bisphenol F diglycidyl ether does not lead to gelation even after 5000 h at 70° C.

FIG. 3 shows the gelation times (12 g, 70° C.) of these curing catalysts in a cycloaliphatic oxirane. It is apparent that the reactivity of these catalyst types is very low in the tape adhesive, the 1,2-oxirane epoxy resin, but by contrast is very high in the cycloaliphatic epoxy resin, the impregnating resin, such that very small contents of curing catalyst are sufficient.

This opens up the possibility of depositing very small contents of first curing catalyst within the range of 0.001% to 1% by weight in the solid insulation materials, such as the mica tapes. This gives rise to virtually no adverse reactivities with the tape adhesive, especially when a tape adhesive based on the 1,2-oxirane epoxy resins and/or epoxy-phenol novolaks is present in the solid insulation material.

After a vacuum impregnation operation, this small content of first curing catalyst leads to gelation in the course of impregnation. Subsequent thermal curing at curing temperatures of practical relevance, i.e., for instance, at 145° C. to 180° C. for 10 h, leads to clear moldings that are free of cavities and blisters and have adequate stiffness, but have very high glass transition temperatures of 160° C. or more.

In addition, it is possible to deposit a relatively unreactive additional curing catalyst, i.e., for example, one with lightoff temperatures around 100° C., in the impregnating agent ("bath curing catalyst"), as a supplement to the tape curing catalyst in the mica tapes. In this way, it is possible to ensure that impregnating resin components that have been insufficiently catalyzed by the tape curing catalyst, for example in closed folds of the mica tape applied, undergo curing during the later heat treatment process. This combination enables the desired gelation within given periods of time and the complete polymerization of the entire impregnation resin which might possibly not have been reached by the tape catalyst. For this purpose, the potential bath accelerators should of course be soluble in the cycloaliphatic epoxy resin.

FIG. 4 shows, in table 2, a list of the compounds that are used by way of example as second curing catalysts, i.e. as what are called bath curing catalysts, because they are present in the liquid insulating composition.

The insulation system described herein may comprise any desired additives which affect, for example, the color, fracture resistance, fracture toughness, brittleness, etc. of the insulation system in the ready-cured state. For example, the cured cycloaliphatic epoxy resin is a very brittle material to which additives are added to increase the fracture resistance and/or to increase the elongation at break. Here, for example, the addition of flexibilizing auxiliaries such as long-chain polyols, for example propylene glycol, may be advantageous.

Figure 5:
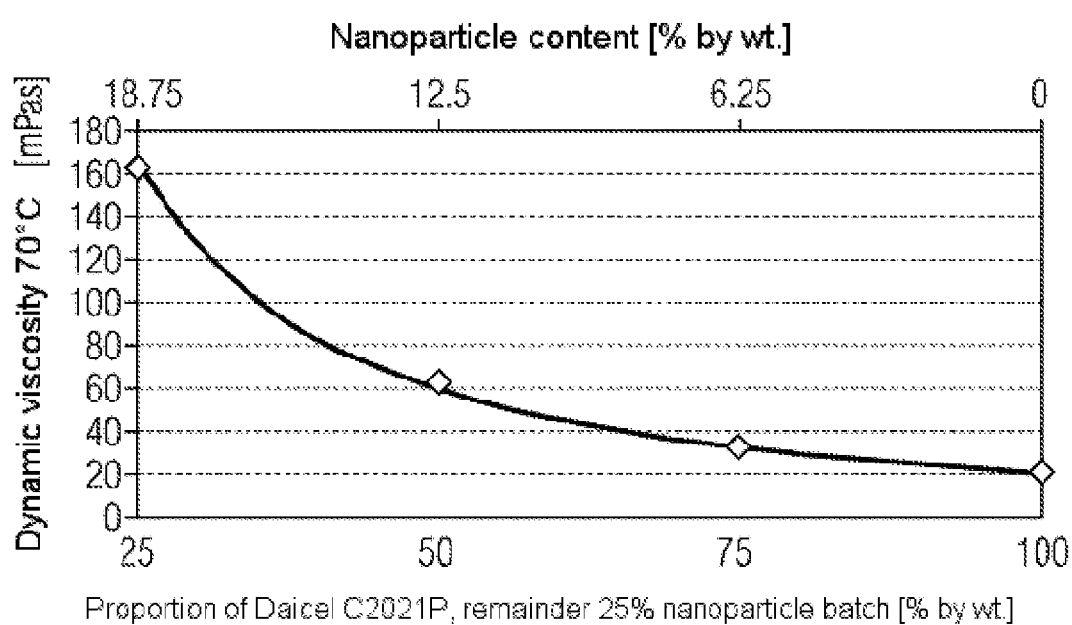
FIG. 5 shows masterbatches containing 25-33% by weight of polymeric nanoparticles can be used in pure form or in a blend with the epoxy resin.

For retention of a high glass transition temperature, it is advantageous, for example, to use nanoparticles, especially polymeric nanoparticles, as additives. The nanoparticles very effectively increase elongation at break and fracture-mechanical property indices with virtually comparable glass transition ranges. Some embodiments include partial and/or complete use of nanoparticle-in-cycloaliphatic EP masterbatches, for example polybutadiene core-shell particles, 90 to 110 nm, agglomerate-free; these particles are detectable, for example, by means of TEM. These masterbatches contain 25-33% by weight of polymeric nanoparticles and can be used in pure form or in a blend with the epoxy resin, as shown in FIG. 5.

The first curing catalysts mentioned may be (virtually) chemically inert in relation to the conventional glycidyl ether-based epoxy resins, for example including epoxy-phenol novolaks which fluid use as tape adhesives, and thus function as highly active, storage-stable first curing catalysts in the solid insulation material.

The cycloaliphatic epoxy resins of the 3,4-epoxycyclohexyl-methyl 3',4'-epoxycyclohexanecarboxylate type, which in some embodiments serve as impregnating resin, have low dynamic viscosities and permit the impregnation of numerous mica tape layers, especially in generator construction. Furthermore, they develop very high glass transition temperatures in the polymerization, initiated by the curing catalyst.

An insulation system produced with the above-described components by the vacuum impregnation method can compete with the insulation system composed of bisphenol A diglycidyl ether EPR162 and methylhexahydrophthalic anhydride EPH868 that has been commonly used to date with regard to the glass transition of greater than 150° C. (10 h/145° C.)

By virtue of the combination of a highly active, inert first curing catalyst in the solid insulation material with the highly mobile cycloaliphatic epoxy resin, it is possible to establish high glass transition temperatures without the use of acid anhydrides. This first curing catalyst or a second curing catalyst which is less reactive in the cycloaliphatic epoxy resin cure the acid anhydride-free insulation system, giving comparable Tgs.

In embodiments with a second curing catalyst in the impregnating agent, in conjunction with the first curing catalyst, it may improve reliable, complete impregnation of the entire impregnating agent. This second curing catalyst leads to curing with small proportions, e.g. in the range of 0.1-5% by weight, based on the pure cycloaliphatic epoxy resin. To increase the fracture resistance or elongation at break, it may be appropriate to the purpose to mix a portion of polymeric nanoparticles into the cycloaliphatic epoxy resin impregnating resin, e.g. in the form of nanoparticle masterbatches with an identical epoxy resin matrix. Likewise conceivable is extending with flexibilizers based on long-chain diols, such as polypropylene glycols or the like, that are known to the person skilled in the art.

What is claimed is:

1. A combination for producing insulation using a vacuum impregnation process, the combination comprising:

an impregnating agent;
a carrier;
a barrier material;
a tape adhesive bonding the barrier material to the carrier; and
a first curing catalyst deposited in the tape adhesive;
wherein the first curing catalyst is (a) inert toward the tape adhesive but (b) reactive with the impregnating agent;
wherein the impregnating agent includes an impregnating resin comprising a cycloaliphatic epoxy resin at an impregnation temperature in a range from 25 to 100 degrees Celsius, with gelation times of 1 to 15 h at the impregnation temperature, and a second curing catalyst dissolved in the cycloaliphatic epoxy resin making up less than 10% by weight of the impregnating agent;
wherein the impregnating resin has a viscosity of less than 1500 mPas at the impregnation temperature; and
wherein the second curing catalyst has a lightoff temperature above 100 degrees Celsius.

2. The combination as claimed in claim 1, wherein the carrier comprises woven fabric, nonwoven fabric, or a film.

3. The combination as claimed in claim 2, wherein the barrier material is present on, in, or atop the carrier.

4. The combination as claimed in claim 1, wherein the barrier material is at least partly particulate.

5. The combination as claimed in claim 4, wherein the barrier material is at least partly in platelet form.

6. The combination as claimed in claim 1, wherein the tape adhesive comprises a glycidyl ether epoxy resin having repeat units from n=0 to n=50.

7. The combination as claimed in claim 1, wherein the tape adhesive comprises an epoxy novolak or epoxy-phenol novolak having functionalities n=0.1 to 8.

8. The combination as claimed in claim 1, wherein the tape adhesive comprises diols, triols and/or polyols.

9. The combination as claimed in claim 1, wherein the tape adhesive comprises 1% to 30% by weight of a total weight of a solid insulation material resulting from application of the vacuum impregnation to the combination.

10. The combination as claimed in claim 1, wherein the first curing catalyst comprises 0.001% by weight to 7.5% by weight of a total weight of a solid insulation material resulting from application of the vacuum impregnation to the combination.

11. The combination as claimed in claim 1, wherein the first curing catalyst comprises a superacid with a pKa of less than −3.

12. The combination as claimed in claim 1, wherein the first curing catalyst comprises a thermally activatable superacid.

13. The combination as claimed in claim 10, wherein the curing catalyst comprises a latently active superacid.

14. The combination as claimed in claim 1, wherein the first curing catalyst lights off at a temperature between 20° C. and 100° C.

15. The combination as claimed in claim 10, wherein the first curing catalyst comprises a complex of a superacid fluoro anion with a crown ether.

16. The combination as claimed in claim 15, wherein the first curing catalyst comprises a complex of a silver hexafluoroantimonate with a 15-crown-5 crown ether.

17. The combination as claimed in claim 1, wherein the impregnating agent, once cured, has a glass transition temperature greater than 110° C.

18. The combination as claimed in claim 1, wherein the first curing catalyst comprises a quaternary organic ammonium.

* * * * *